W. RICHTER.
PRESSURE GAUGE REGULATOR.
APPLICATION FILED OCT. 16, 1920.

1,409,028.

Patented Mar. 7, 1922.

Inventor
Willy Richter;

By
Geo. P. Kimmel.
Attorney

UNITED STATES PATENT OFFICE.

WILLY RICHTER, OF OLMSTEAD, ILLINOIS.

PRESSURE-GAUGE REGULATOR.

1,409,028.　　　　Specification of Letters Patent.　　Patented Mar. 7, 1922.

Application filed October 16, 1920. Serial No. 417,348.

*To all whom it may concern:*

Be it known that I, WILLY RICHTER, a citizen of the United States, residing at Olmstead, in the county of Pulaski and State of Illinois, have invented certain new and useful Improvements in a Pressure-Gauge Regulator, of which the following is a specification.

This invention relates to pressure gauge regulators.

The object of the invention is to provide an attachment for a tank gauge to replace in the air pressure chamber of such gauge air shrunken in volume and pressure power or to remove excess air from said gauge chamber to cause the tank gauge to indicate correctly.

It is well known that pressure gauges for tanks frequently register incorrectly owing to the fact that atmospheric conditions affect the pressure fluid causing it to contract or expand so that the gauge does not properly indicate the pressure in the tank with which the gauge is connected. The attachment constituting this invention is designed to overcome this defect in such gauges and cause them to register accurately.

With these and other objects in view, the invention consists in certain novel features of construction, as hereinafter shown and described and then specifically pointed out in the claims, and in the drawings illustrative of the preferred embodiment of the invention.

In the accompanying drawing.

Figure 1:
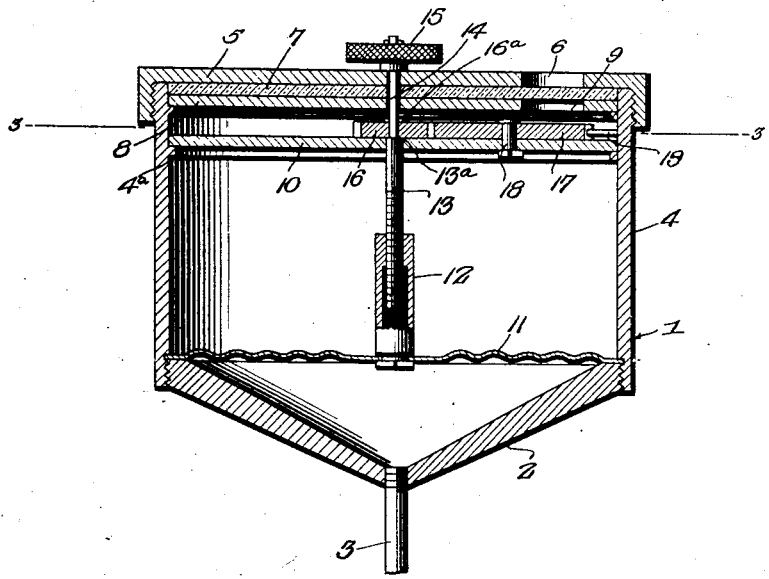
Figure 1 represents a central vertical section of the attachment constituting this invention.

The attachment 1 constituting this invention has an inverted cone-shaped bottom 2 with a conduit 3 leading from the apex thereof and designed to connect the attachment 1 with the air pressure chamber of a tank gauge. (Not shown.)

The attachment comprises a casing 4 here shown cylindrical in form, the bottom 2 of which is detachably mounted therein and a top 5 is threaded on the upper end thereof, said top having a sight opening 6 formed therein for a purpose presently to be described.

A glass plate 7 is arranged under the top 5 and supported on a plate 8 which also has a sight opening 9 positioned to register with the opening 6 in top 5, the glass 7 being arranged between these sight openings effectively closing the casing and yet permitting an indicator arranged below them to be viewed as will be presently described.

Another plate 10 spaced inwardly from plate 8 is mounted in the upper end of the casing 4 and supported on an annular flange 4ª carried by the inner wall of said casing as is shown clearly in Fig. 1. A corrugated expansible diaphragm 11 is secured airtight to the upper edge of the bottom 2 forming an air chamber in said bottom below the diaphragm. A hollow post 12 is fixed to the diaphragm at the center thereof and projects upwardly into the casing 4 having its upper end internally reduced and threaded to receive a threaded stem 13. This stem 13 passes through the plate 10 and the portion above said plate is reduced and extended through plate 8, glass 7 and top 5 and carries at its outer end a knurled thumb nut 15 which is secured to said reduced extension 14 in any suitable manner.

Figures 2, 3:
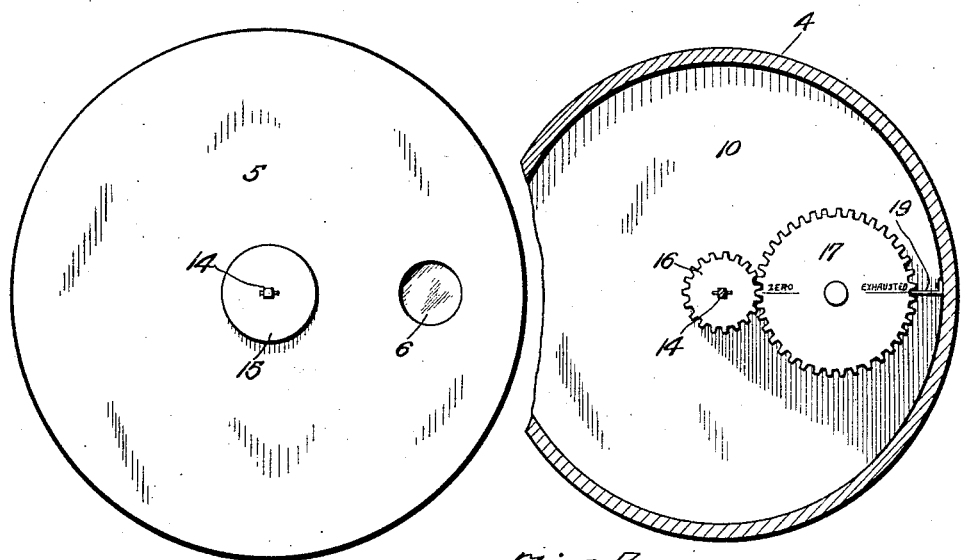
Fig. 2 is a top plan view thereof.
Fig. 3 is a horizontal section taken on the line 3—3 of Fig. 1.

A shoulder 13ª is formed at the inner end of the reduced extension 14 of the stem 13 and a cog wheel 16 is mounted on said extension between said shoulder and a pin 16ª. A gear 17 is mounted on a suitable pivot 18 carried by plate 10 and meshes with the cog wheel 16, said gear being held against casual rotation by a spring pawl 19 shown fixed at one end to the inner wall of the casing 4 with its free end engaged between two of the teeth of gear 17 whereby said gear is held against casual rotation but may turn when a slight amount of force is exerted thereon such as would be occasioned by the rotation of the cog 16. It will thus be seen that the diaphragm controlling means will be held against accidental changing thereof. The reduced extension 14 of stem 13 is angular in cross section as shown in Fig. 3 and the cog 16 has a correspondingly shaped aperture through which said extension passes and by means of which it is caused to rotate with the stem on the turning thereof.

From the above description it will be obvious that the turning of the thumb nut 15, which is also fixed to the stem extension 14, will operate to raise or lower the diaphragm 11 according to the direction in which said nut is turned and will simultaneously rotate the gear wheel 17. This gear wheel 17 is provided on its upper face with indicia to direct the operator in which direction the stem 13 should be turned to vary the pressure in the gauge with which this attachment is connected.

A gauge equipped with this attachment may be balanced so as to indicate correctly simply by turning the knob or nut 15 to the right or left to raise or lower the diaphragm 11 whereby air is either drawn out of or forced into the air pressure chamber of the tank and the gear 17 will indicate through the sight openings 6 and 9 the direction in which the knob is to be turned to increase or reduce the pressure in the diaphragm chamber and thereby cause the tank gauge with which this attachment is connected by conduit 3, to indicate properly.

It is of course understood that in order to properly balance the tank gauge by the use of this device it is necessary to first ascertain the correct amount of liquid in the tank in connection with which the gauge is used which is accomplished either by means of a float gauge or otherwise and then the attachment 1 is used to either force air into the gauge or to remove it therefrom so as to produce a proper pressure in the air pressure chamber of the gauge to enable it to register correctly.

The preferred embodiment of the invention is disclosed in the drawings and set forth in the specification, but it will be understood that any modifications within the scope of the claims may be made in the construction without departing from the principle of the invention or sacrificing any of its advantages.

What I claim is:

1. A pressure gauge regulator comprising a casing having an air chamber with a fluid-tight diaphragm forming one wall thereof and a conduit leading from said chamber and adapted to be connected with the air pressure chamber of the tank gauge, means for manipulating said diaphragm to draw air into or expel it from said chamber, said means including meshing gears, and a spring to engage the teeth of one of said gears to hold the diaphragm controlling means against casual movement.

2. A pressure gauge regulator comprising a casing having a diaphragm arranged transversely thereof and secured thereto in air-tight relation to form a chamber below it, a conduit leading from said chamber and adapted to be connected with the air pressure chamber of a tank gauge, said casing having a sight opening therein with an indicator arranged below it, rotary means for raising and lowering said diaphragm to expel or draw in air to the air chamber of the casing and to simultaneously operate said indicator.

3. A pressure gauge regulator comprising a casing having an air chamber therein with a movable diaphragm arranged thereover, and a conduit leading therefrom, telescoping elements carried one by said diaphragm and the other by said casing and having threaded engagement whereby the turning of one within the other in one direction or the other will operate to raise or lower the diaphragm, and indicating means connected with the movable telescoping member and operated thereby.

In testimony whereof, I affix my signature hereto.

WILLY RICHTER.